United States Patent [19]

Takahashi

[11] Patent Number: 4,789,900
[45] Date of Patent: Dec. 6, 1988

[54] IMAGE COMMUNICATION APPARATUS PERMITTING BOTH IMMEDIATE RECORDING AND STORING OF A RECEIVED IMAGE TRANSMITTED WITH A MAGNIFICATION CHOSEN ACCORDING TO A CURRENT OR RECENTLY-USED RECORDING SHEET SIZE AT THE RECEIVING SIDE

[75] Inventor: Masatomo Takahashi, Tokyo, Japan
[73] Assignee: Canon Kabushiki Kaisha, Tokyo, Japan
[21] Appl. No.: 24,521
[22] Filed: Mar. 11, 1987
[30] Foreign Application Priority Data Mar. 18, 1986 [JP] Japan ................................. 61-58082

[51] Int. Cl.⁴ ...................... H04N 1/32; H04N 1/393; H04N 1/40
[52] U.S. Cl. .................................. 358/257; 358/280; 358/287
[58] Field of Search ............... 358/256, 257, 280, 285, 358/287, 293

[56] References Cited

U.S. PATENT DOCUMENTS

| 4,353,097 | 10/1982 | Takeda et al. | 358/287 |
| 4,598,323 | 7/1986 | Honjo et al. | 358/280 |
| 4,622,594 | 11/1986 | Honjo et al. | 358/280 |
| 4,672,460 | 6/1987 | Tsuda | 358/257 |
| 4,677,649 | 6/1987 | Kunishi et al. | 358/260 |
| 4,679,093 | 7/1987 | Yaguchi | 358/257 |
| 4,704,636 | 11/1987 | Yano | 358/256 |
| 4,706,127 | 11/1987 | Nobuta | 358/280 |
| 4,712,139 | 12/1987 | Kato | 358/257 |
| 4,717,967 | 1/1988 | Yoshida | 358/280 |
| 4,731,658 | 3/1988 | Koseki | 358/257 |

FOREIGN PATENT DOCUMENTS

| 54-132115 | 10/1979 | Japan | 358/280 |
| 55-118268 | 9/1980 | Japan | 358/287 |
| 57-97765 | 6/1982 | Japan . | |
| 58-50856 | 3/1983 | Japan | 358/256 |
| 58-66466 | 4/1983 | Japan . | |
| 58-66467 | 4/1983 | Japan . | |
| 58-73277 | 5/1983 | Japan . | |
| 58-92168 | 6/1983 | Japan . | |
| 58-97962 | 6/1983 | Japan . | |
| 58-161460 | 9/1983 | Japan | 358/256 |
| 58-164369 | 9/1983 | Japan | 358/287 |
| 59-168768 | 9/1984 | Japan . | |
| 60-18062 | 1/1985 | Japan . | |
| 60-18063 | 1/1985 | Japan . | |
| 60-107976 | 6/1985 | Japan . | |
| 60-119170 | 6/1985 | Japan | 358/257 |
| 60-130969 | 7/1985 | Japan . | |
| 60-127869 | 7/1985 | Japan | 358/257 |
| 60-128770 | 7/1985 | Japan | 358/257 |
| 60-154768 | 8/1985 | Japan . | |
| 60-157374 | 8/1985 | Japan . | |
| 60-153666 | 8/1985 | Japan | 358/280 |
| 60-163570 | 8/1985 | Japan . | |
| 60-182865 | 9/1985 | Japan | 358/287 |
| 60-227569 | 11/1985 | Japan . | |
| 61-6977 | 1/1986 | Japan . | |
| 61-33069 | 2/1986 | Japan . | |
| 2166619 | 5/1986 | United Kingdom | 358/256 |

Primary Examiner—James J. Groody
Assistant Examiner—Randall S. Svihla
Attorney, Agent, or Firm—Fitzpatrick, Cella, Harper & Scinto

[57] ABSTRACT

An image communication apparatus such as a facsimile apparatus having a recording unit to print the reception image data. This apparatus has a receiving unit to receive an image signal from an original document, a recording unit to record the received images, an image memory to store the received image when the recording unit does not record the image, and a declaring unit to declare the size of recording sheet set in the recording unit upon storage in the image memory. The declaring unit has a memory to record information on the size (e.g., the width) of the recording sheet set in the recording unit. When no recording sheet is set in the recording unit, or when the recording sheet width is improper, the reception information is stored in the image memory. Alternatively, when for some reason the received image cannot be recorded, numbers representing the frequency of actual use of the various recording sheet sizes are read out from a memory where they are stored for that purpose, and the size represented by the maximum from among those numbers is declared to the transmission side. With this apparatus, the image reception near the expected image and function can be performed.

11 Claims, 3 Drawing Sheets

IMAGE COMMUNICATION APPARATUS PERMITTING BOTH IMMEDIATE RECORDING AND STORING OF A RECEIVED IMAGE TRANSMITTED WITH A MAGNIFICATION CHOSEN ACCORDING TO A CURRENT OR RECENTLY-USED RECORDING SHEET SIZE AT THE RECEIVING SIDE

BACKGROUND OF THE INVENTION

1. Field of the Invention

The present invention relates to an image communication apparatus having a recording unit to print received data.

RELATED BACKGROUND ART

Recent facsimile apparatuses have a substitute receiving function such that a memory having a large capacity is provided and the received image, when it cannot be output (printed) by a recording unit, is stored in the memory. For such substitute reception, there is considered a method whereby the size of recording sheet set on the reception side is declared to be the maximum recording sheet size which can be recorded by each facsimile apparatus in accordance with the initial procedure conducted with the transmission side.

However, with such substitute reception, even if the user sets recording sheets on the apparatus, to thereby output the reception image from the substitute memory after completion of the substitute reception, when a recording sheet whose size is smaller than the declared maximum recording sheet size was previously set, a reduced received image is output. Further, when the user unconditionally declares the maximum recording sheet size as mentioned above, the received image is output irrespective of the recording sheet size which is always used by the user. The apparatus, thus, operates in a manner which gives little regard to the user's expectations as to the image and function normally to expected, causing confusion.

SUMMARY OF THE INVENTION

It is an object of the present invention to provide an image communication apparatus in which the substitute receiving function is improved on the basis of the foregoing background of the invention.

Another object of the invention is to provide an image communication apparatus in which the output by substitute reception using a memory and the output by the reception on a recording sheet by an ordinary recording unit are aligned so as to have the capabilities of the levels as equal as possible, thereby eliminating the confusion of working efficiency for the user.

In more detail, it is one aspect of the present invention to provide an image communication apparatus comprising: means for detecting the reception; means for storing a size of recording sheet set in a recording unit upon reception; means for discriminating whether the received image can be output by the recording unit or not; means for declaring the recording sheet size stored in the memory means to the transmission side as a size of recording sheet which is set at present when the received image cannot be output by the recording unit; and means for controlling so as to store the received image in a memory when the stored recording sheet size has been declared.

It is another aspect of the invention to provide an image communication apparatus in a facsimile apparatus having a recording unit to output a reception image and a memory capable of storing the reception image, wherein this image communication apparatus comprises: means for detecting the reception; means for storing a size of recording sheet set in the recording unit upon reception; means for counting the number of storage times of the recording sheet size into the memory means for every recording sheet size; means for discriminating whether the received image can be output by the recording unit or not; and means for declaring to the transmission side the recording sheet size for which the greatest number of storage times has been counted by the counting means as a size of recording sheet which is set at present when the received image cannot be output by the recording unit.

The above and other objects and features of the present invention will become apparent from the following detailed description of the preferred embodiment and the appended claims with reference to the accompanying drawings.

DETAILED DESCRIPTION OF THE PREFERRED EMBODIMENTS

The present invention will be described in detail hereinbelow with reference to the drawings.

Figure 1:
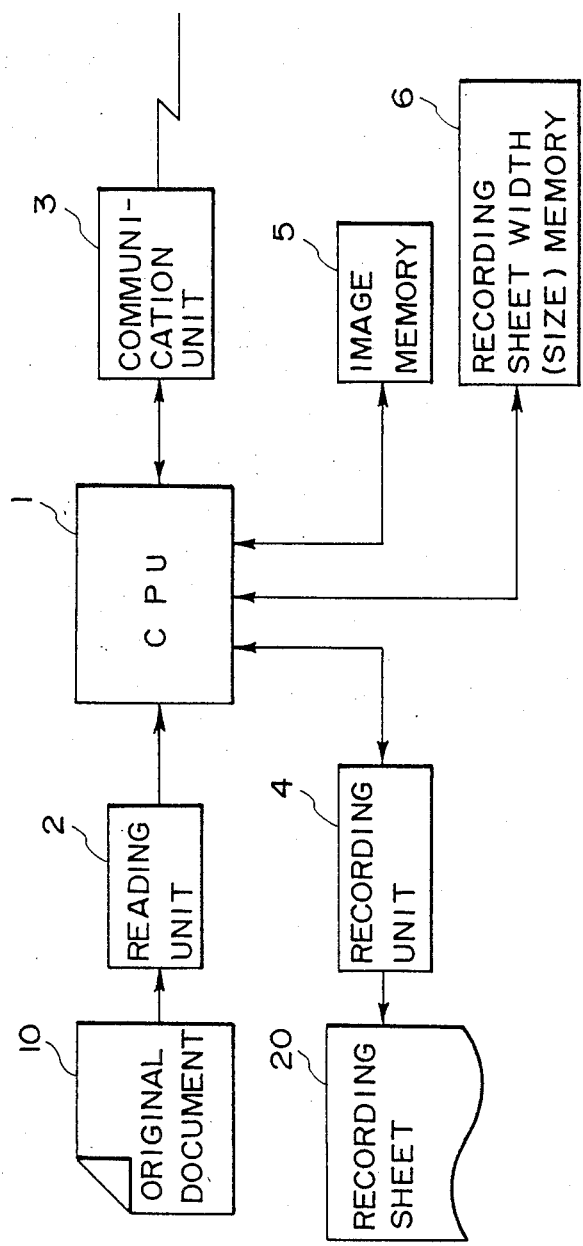
FIG. 1 is a block diagram showing a system construction of an embodiment of the present invention.

FIG. 1 is a block diagram showing a construction of an embodiment of the invention. In FIG. 1, reference numeral 1 denotes a central control unit such as a central processing unit (CPU) or the like. Upon transmission, the central control unit 1 encodes the image data regarding an original document 10 which has been read out by a reading unit 2 and transmits the code data to a communication unit 3 to control a communication line. The code data is transmitted from the communication unit 3 to a distant side apparatus. The communication procedure and the like in the communication unit 3 are controlled by the central control unit 1.

Upon reception, the communication unit 3 is controlled by the central control unit 1 to thereby control communication procedure signals.

A size or dimension of recording sheet set at present, e.g., data concerned with the width of recording sheet is read out of a recording unit 4 and stored to a recording sheet size memory 6.

The central control unit 1 receives the image data sent from the communication unit 3 and decodes it and thereafter, the central processing unit 1 sends the decoded data to the recording unit 4 and outputs it to a recording sheet 20.

On the other hand, upon substitute reception, image data is received and the received image is stored to an image memory 5 on the assumption that recording sheet 20 having the width corresponding to the recording sheet width data stored in the memory 6 is set in the recording unit 4.

Figure 2:
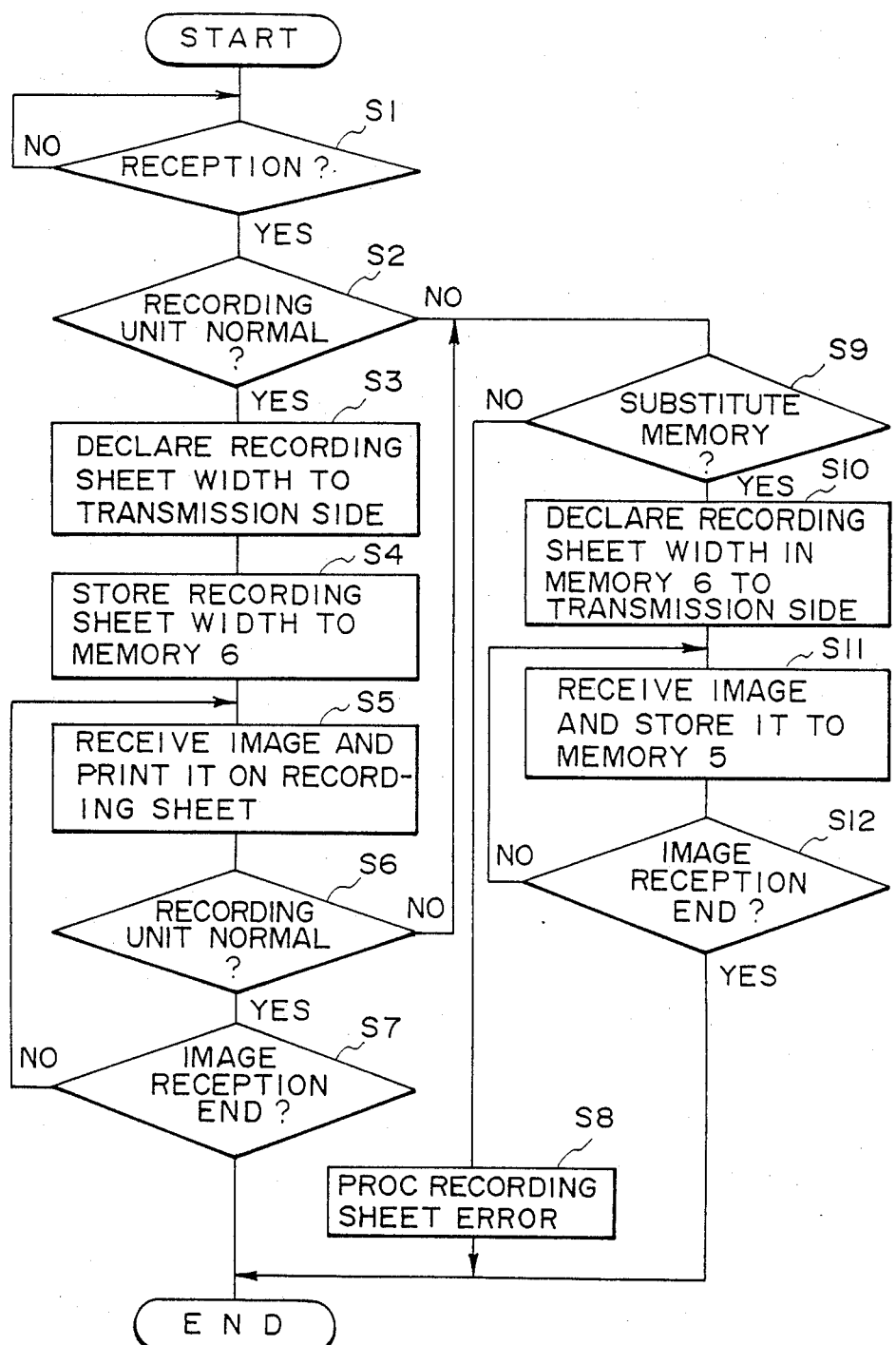
FIG. 2 is a flowchart showing an example of a processing procedure in the embodiment of FIG. 1.

Next, FIG. 2 shows an example of a control procedure of the central control unit 1.

In FIG. 2, when the reception is started in step S1, step S2 follows to check the state of the recording unit 4. Namely, in step S2, a check is made to see if the recording unit 4 can print the image onto the recording sheet 20 normally or not, by checking whether the recording sheet 20 is set or not, whether a jam of recording sheet 20 has occurred in the recording unit 4 or not, and the like.

If the recording unit 4 can print the image normally, step S3 follows and the width of the recording sheet which is set at present is detected in the recording unit 4, and this width is declared to the transmission side in the preparing procedure.

The transmission side discriminates the capability of the reception side in response to the content of the declaration, and when the declared recording sheet width is narrower than the width of the original document to be transmitted, the transmission side reduces the image and transmits the reduced image.

In the next step S4, the recording sheet width declared in step S3 is stored in the memory 6.

Thereafter, the image is received in step S5 and printed on the recording sheet 20. Next, step S6 follows. In step S6, a check is again made to see if the recording unit 4 is normal or not. If it is normal, step S7 follows to see if the image reception has been finished or not. If YES, the processing routine is ended.

If it is decided in step S6 that the recording unit 4 is abnormal because of, e.g., the absence of recording sheets or the like, step S9 follows.

Also, if it is determined in step S2 that the recording unit 4 is abnormal, the processing routine also advances to step S9. If the substitute memory is found in step S9 to exist, step S10 follows, and, otherwise, a recording sheet error is determined to exist (step S8), using a conventional error processing, information representing existence of an error state or absence of recording sheets is sent to the transmission side, and the line is opened.

In step S10, the recording sheet width in the preceding normal communication, which width has been stored in the memory 6 in step S4 in the case of the preceding ordinary reception is read out of the memory 6 and the procedure is carried out as if the recording sheet 20 having the read-out recording sheet width has already been set, and this content is declared to the transmission side.

In the next step S11, the image data is received and the image data is stored to the memory 5. Further, in the next step S12, a check is made to see if the image data has completely been received or not. If the reception of the image data has ended, the processing routine is finished.

In this embodiment, in steps S4 and S10, the recording sheet width used by the user is detected and stored to the memory each time it is received, while upon substitute reception, by declaring the stored recording sheet width to the transmission side, the image can be received. On the other hand, if a roll-shaped recording sheet is used, when the recording sheet has completely been used, its core pipe is left in the recording unit. Therefore, the width of such a roll-shaped recording sheet can be also detected upon substitute reception, thereby enabling the recording sheet width to be declared. If cut sheets are used, the recording sheet width can be also declared on the basis of the size of cassette for containing the cut sheets.

However, if the recording sheets were purposely taken out or if the cassette is not set in the case of using cut sheets, the recording sheet width cannot be detected. In such a case, the substitute reception can also be executed because the previous recording sheet width has already been written in the memory 6.

When the substitute reception is purposely performed, the recording sheet width can be also arbitrarily set.

In the foregoing embodiment, the recording sheet width upon ordinary normal reception which is executed prior to the substitute reception is stored in the memory 6, and the image reception is performed using the substitute memory upon substitute reception.

Figure 3:
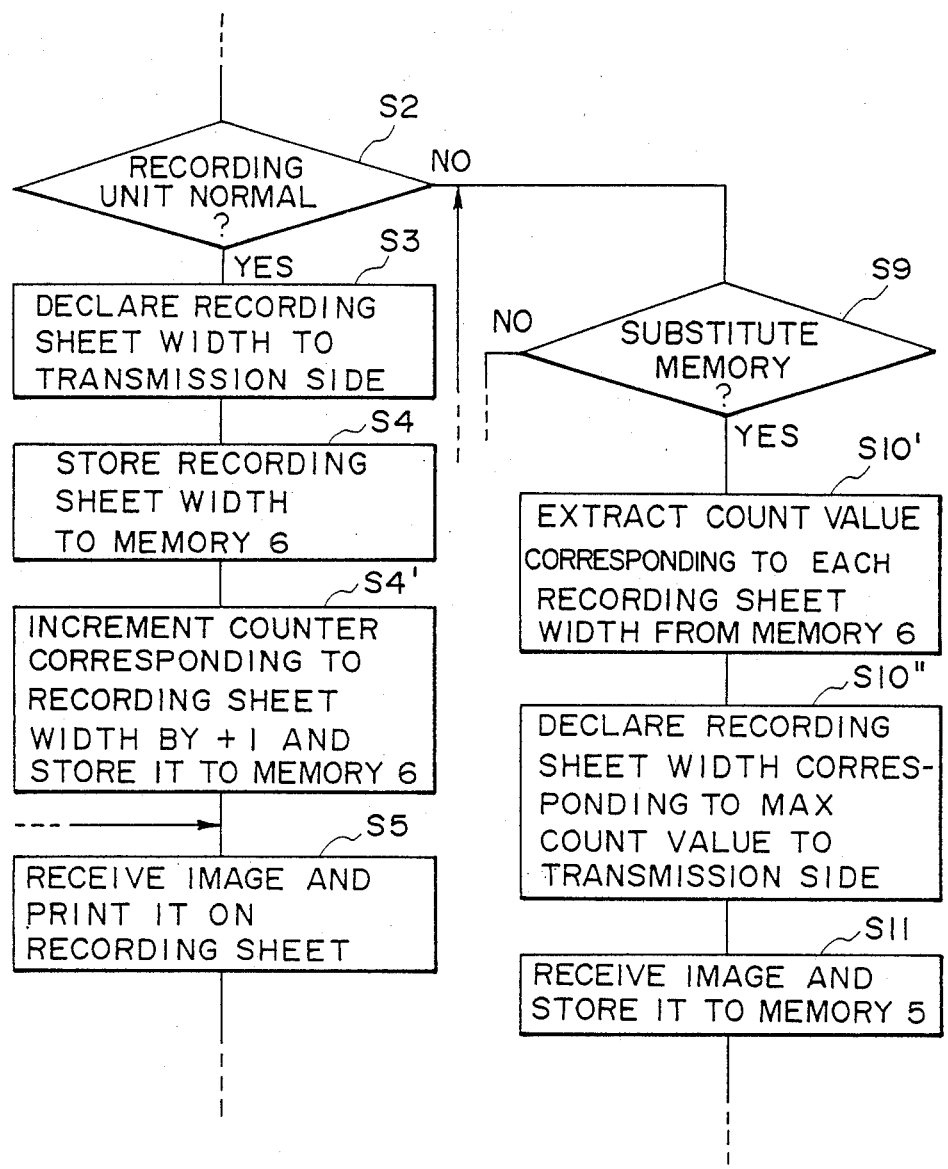
FIG. 3 is a flowchart illustrating another embodiment of the invention.

FIG. 3 shows another embodiment. In FIG. 3, only the steps different from FIG. 2 are shown.

In step S4, the recording sheet width is stored in the memory 6. The memory 6 is provided with a counter corresponding to each of a plurality of recording sheet widths. In step S4', each time the recording sheet width is written in the memory 6, the count value of the counter corresponding to that recording sheet width is increased by +1 and the use frequency of this recording sheet width is added and stored in the memory 6.

Upon substitute reception, the count value of each counter is extracted from the memory 6, thereby providing the frequency of use of the recording sheet width by the user on the basis of the count value in step S10'. In the next step S10'', the recording sheet width having the maximum count value is declared to the transmission side, to make the recording sheet width nearer the style of use of the ordinary apparatus by the user, and the substitute reception is performed.

As described above, according to the present invention, the recording sheet size such as a recording sheet width or the like upon ordinary reception is stored in the memory. Therefore, even in the substitute reception, the recording sheet can be set having the size most often used with the apparatus, so that it is possible to perform the image reception which is close to the image and function which are always expected by the user of the apparatus.

On the other hand, there is no need to convert the size of data in the image memory excluding the case where the size of recording sheet which is set after all of the recording sheets in the recording unit have completely been used differs from the preceding size.

The present invention is not limited to the foregoing embodiments but many modifications and variations are possible within the spirit and scope of invention, as defined in the appended claims.

What is claimed is:

1. An image communication apparatus comprising:
   receiving means for receiving an image signal;
   recording means for recording the received image signal received by said receiving means;
   an image memory for storing the received image signal if said recording means does not record the received image signal; and
   declaring means for declaring a dimension of a recording sheet set in said recording means to a transmission side transmitting the image signal to said receiving means when the received image signal is to be stored in said image memory.

2. An image communication apparatus according to claim 1, wherein said declaring means has memory means for storing information indicative of the dimension of the recording sheet set in said recording means.

3. An image communication apparatus according to claim 1, wherein if said recording means is unable to record the received image signal, the received image signal is stored in said image memory.

4. An image communication apparatus according to claim 3, wherein the inability of said recording means to record the received image signal denotes the absence of a recording sheet from said recording means.

5. An image communication apparatus according to claim 2, wherein said memory means stores the dimension-indicative information before the received image signal is input to said recording means.

6. An image communication apparatus comprising:
receiving means for receiving an image signal;
recording means for recording the received image signal received by said receiving means;
an image memory capable of storing the received image signal;
means for storing a dimension of a recording sheet set in said recording means;
means for discriminating whether the received image signal can be recorded by said recording means or not;
means for declaring the recording sheet dimension stored in said storing means to a transmission side transmitting the image signal to said receiving means as a dimension of a recording sheet on which the received image signal is to be recorded, when said recording means is incapable of recording the received image signal; and
means for controlling said apparatus so as to store the received image signal in said image memory when said declaring means performs the declaration.

7. An image communication apparatus according to claim 6, wherein said storing means stores the recording sheet dimension when the image signal is sent from said receiving means to said recording means for recording.

8. An image communication apparatus comprising:
receiving means for receiving an image signal;
recording means for recording the received image signal received by said receiving means;
an image memory for storing the received image signal if said recording means does not record the received image signal;
detecting means for detecting a dimension of a recording sheet having the one size of a plurality of different recording sheet sizes which has been set most often for recording by said recording means; and
means for declaring the recording sheet dimension detected by said detecting means to a transmission side transmitting the image signal to said receiving means when the received image signal is to be stored in the image memory.

9. An image communication apparatus according to claim 8, wherein said detecting means has means for counting the number of times each recording sheet size has been set for recording by said recording means.

10. An image communication apparatus according to claim 8, wherein if said recording means is unable to record the received image signal, the received image signal is stored in said image memory.

11. An image communication apparatus according to claim 10, wherein the inability of said recording means to record the received image signal denotes the absence of a recording sheet from said recording means.

* * * * *